United States Patent [19]

Haghiri

[11] Patent Number: 4,965,666
[45] Date of Patent: Oct. 23, 1990

[54] METHOD OF AND ARRANGEMENT FOR ESTIMATING AND COMPENSATIING MOTION IN A SEQUENCE OF PICTURES AND A PICTURE TRANSMISSION SYSTEM PROVIDED WITH SUCH AN ARRANGEMENT

[75] Inventor: Mohammad-Réza Haghiri, Sceaux, France

[73] Assignee: U.S. Philips Corporation, New York, N.Y.

[21] Appl. No.: 276,185

[22] Filed: Nov. 23, 1988

[30] Foreign Application Priority Data

Nov. 27, 1987 [FR] France ............................. 87 16477

[51] Int. Cl.⁵ ..................... H04N 7/18; H04N 7/12
[52] U.S. Cl. ................................ 358/105; 358/136
[58] Field of Search ............... 358/105, 136, 135, 133

[56] References Cited

U.S. PATENT DOCUMENTS

| | | | |
|---|---|---|---|
| 4,232,338 | 11/1980 | Netrarali | 358/136 |
| 4,766,490 | 8/1988 | Haghiri | 358/105 |
| 4,816,914 | 3/1989 | Ericsson | 358/133 |
| 4,849,810 | 7/1989 | Ericsson | 358/136 X |
| 4,875,094 | 10/1989 | Haghiri et al. | 358/105 |

FOREIGN PATENT DOCUMENTS 2590701  11/1985  France .

OTHER PUBLICATIONS

"Movement Compensated Interframe Prediction for NTSC Color TV Signais", Sabri, IEEE Transaction, vol. Com 32#8; Aug. '84.

Primary Examiner—Vic Kostak
Attorney, Agent, or Firm—Michael E. Marion

[57] ABSTRACT

An arrangement for estimating motion in a sequence of picture comprising first, second and third picture stores (10, 20, 30) arranged in series to ensure the permanent storage of three respective consecutive pictures denoted, for example, by their rank 2k, 2k+1, 2k+2 in the sequence of pictures, and a recursive displacement estimator (40) receiving the outputs of said first and third picture stores to update at each extension of the classifying tree the displacement vectors relating to the junctions of the tree and the send them to a delayed-decision circuit (50), said delayed-decision circuit receiving said updating information and also the outputs of said picture stores and supplying, for each block preceding the current block of L blocks, the information of the group in which this preceding block and the information of the corresponding displacement vector is finally classified. This arrangement is more specifically suitable for use in the transmission of high-definition television pictures, and also for use in the field of teleconferencing or the field of picture recording.

33 Claims, 5 Drawing Sheets

METHOD OF AND ARRANGEMENT FOR ESTIMATING AND COMPENSATING MOTION IN A SEQUENCE OF PICTURES AND A PICTURE TRANSMISSION SYSTEM PROVIDED WITH SUCH AN ARRANGEMENT

BACKGROUND OF THE INVENTION

A related copending application is U.S. Ser. No. 179,109 filed Apr. 8, 1988.

The present invention relates to a method of estimating and compensating motion in a sequence of pictures in which the brightness of each picture element is expressed digitally. It also relates to an arrangement for estimating and compensating motion for putting this method into effect, and also a picture transmission system provided with such an arrangement, and the transmission and receiving stages of such a system. In the sequel of the present description it will be described that this type of motion estimation and compensation applies to a method of sub-sampling and temporal interpolation.

Such an invention is suitable for use in, for example, the field of high-definition television, and also in applications as, for exampe, tele-meetings (also denoted video-conference) or in the recording of pictures. The French Patent Application FR-A 2,590,701 (PHF 85/591); U.S. Pat. No. 4,766,490 describes a motion estimating arrangement which is based on a recursive displacement estimation method. Put more accurately, in this method there occurs, in accordance with a predetermined criterion, a classification of the picture elements into three groups in which these points are classed, with a delay of L elements, in accordance with the progressing scanning of the picture. This classification is effected after examination of a classifying tree whose successive branches correspond to three possible groups to which L consecutive elements are assumed to belong. Optionally, this classification is effected in a simplified manner, after examination, in said tree, of a predetermined, limited number of these possible sequences of groups for the L picture elements subsequent to the present considered element.

When, in a sequence of picture one wants to recover a picture on the basis of the preceding picture, the arrangement described in said document thus indeed operates satisfactorily. The operating principle of this arrangement has however proved to be not suitable when it is used in high-definition television. In that application, an additional processing operation has indeed proved to be necessary to adapt to the transmission channel (the analog channel provided when the MAC-packet transmission standard is used which is called-on to replace the SECAM and PAL standards) the very large quantity of information components to be transmitted. Such a processing operation may, among other examples, comprise a spatial sub-sampling operation which has for its effect to regularly suppress a certain number of picture elements within the same picture or within the same field, or in a temporal sub-sampling operation which has for its effect to suppress regularly a certain number of pictures or fields in a sequence of pictures.

In high-definition television, this periodical cancellation of a certain number of pictures or fields, for example one picture out of every two pictures, compels a recovery on the basis of the picture of rank n−2, which is located further on. This recovery would be possible but does not allow the recovery of the appropriate quality of a high-definition picture.

SUMMARY OF THE INVENTION

The invention has for its object to provide a method of estimating and compensating motion in a sequence of pictures which would be suitable for use in application in which on the one hand a large number of information componets to be transmitted in the case of said application and on the other hand limited spectral characteristics of the available transmission channel must be taken into account. Therefore, the invention relates to a method which is characterized in that each picture is divided into blocks of I×J elements, each of these blocks being defined by two coordinates (m,n) which denote the rank m of the picture line in which a block is located and the position n of the block in this $m^{th}$ line, respectively and in that said method comprises:

(A) preserving three consecutive pictures in the sequence of initial pictures, denoted by their respective ranks 2k, 2k+1, 2k+2;

(B) defining for the blocks three groups in which they are classified in blocks which are estimated by corrected horizontal recursions, in blocks which are estimated by non-corrected horizontal recursion and in blocks which are estimated by vertical recursion, in which groups the blocks will be classified, with a delay of L blocks, in accordance with the progressing picture scan, by examining, to effect said classification, a predetermined number of sequences of possible groups for the L blocks subsequent to the considered current blocks X, the criterion on which this classification is based being the difference in brightness between two pictures in the sequence of pictures, taking the displacement into account which occurs between one picture and another;

(C) forming a classifying tree whose three branches seen at each branching point are equal in number of those of the possible groups and whose $3^L$ branches occurring as a result thereof at each successive level 1 to L correspond to the sequences of possible groups for the L consecutive considered blocks;

(D) assigning two parameters to each branch of each level:

(a) a first parameter, the displacement vector, which is representative of any displacement of the current block of the picture 2k+1 relative to the preceding and subsequent pictures 2k and 2k+2 and calculated for the element which is representative of said block with the aid of a recursive displacement estimation method;

(b) a second parameter, the accumulated distortion parameter, which is representative of the accumulated sum of the approximation error of the current block and those of the preceding blocks in the number L of blocks, each approximation error being rendered minimal by taking into account the influence of an estimated displacement for a block on the displacement estimated for the L subsequent blocks, and said influence possibly not being investigated, among the $3^L$ possible branches of the classifying tree, with the exception of M branches of the weakest accumulated distortion, referred to as surviving branches, M being a limited number less than the maximum number of branches $3^L$;

(E) taking, at the end of this method, as regards L consecutive blocks in the scanning direction, a majority decision as regards the effective group of the block which, relative to the current block, is located L blocks earlier, said decision being taken by examining the surviving branches and by classifying said blocks situated L blocks earlier in the group to which the majority of surviving branches correspond, and said decision procedure being repeated in an identical manner with the exception of the L last blocks for which no majority decision is taken.

The method thus proposed is advantageous in that sense that the motion estimation realized takes the proper characteristics of the transmission in high-definition television into account. Put more accurately, once the compression of information components has been effected, the method according to the invention provides a recursive estimation method in which the choice of the recursions is effected as follows: let it be assumed that, from one picture to another, the displacement of a picture block is very probably similar to that of a spatially neighbouring block, from which it can then be deducted, with or without a correction term. Simultaneously, this method provides, to optimize this recursive estimation, the minimization of the estimation error, with the aid of a classification of the blocks in accordance with these recursion modes, said classification being effected with a delay to enable the previous statistical study of the class sequences possible for a certain number of blocks following the present block and, thus, not to take actually any classifying decision until after the sequences have been studied.

BRIEF DESCRIPTION OF THE DRAWINGS:

Particulars and advantages of the invention will now become more apparent from the following description which is given, by way of non-limitative example with reference to the accompanying drawings, and in which.

DETAILED DESCRIPTION OF THE INVENTION

In the sequel of the description it is assumed that, after picture taking, processing and analog-to-digital conversion there is available a sequence of digital picture formed by 1250 lines, 1440 picture elements per line, 50 Hz, interlaced 2:1, which form the high-definition pictures to be transmitted. With the object of simplifying the terminology in the following description, instead of defining picture as the combination of two even and odd fields of an interlaced format, picture will be defined as all the spatial information available in connection with a predetermined instant t (that is to say the equivalent of a field). Each picture is subdivided into N blocks, each comprising I×J picture elements which are scanned sequentially. Each of these blocks itself is defined by the two coordinates (m, n) of the element X which is representative of each block, m being the rank of the picture line in which said element is located and n being the rank of the block on this $m^{th}$ line.

The method of processing the sequence of digitized pictures is as follows. On transmission, said picture sequence is prefiltered, so as to remove all the high frequencies located outside the frequency band of the subsequent sub-sampling operation, followed by spatial sub-sampling. This spatial sub-sampling is, for example, the sub-sampling operation which is referred to as line - quincunx and which consists in eliminating one picture element out of every two elements on the lines of a certain parity and to eliminate similarly one element out of every two elements, but with a horizontal displacement through one element, on the lines of the other parity. A temporal sub-sampling operation renders it possible, on the other hand, to cancel one picture out of two pictures in the picture sequence (if the frequency is 1/T, where T corresponds to the time interval separating two consecutive pictures of the initial picture sequence, the time interval between two pictures after temporal sub-sampling becomes 2T): the pictures associated, for example, with the instant $t+(2k+1)T$ are eliminated, the pictures associated with the instants $t+2kT$ and $t+(2k+2)T$ being preserved.

The sequence of pictures thus sub-sampled in space and time is then transferred to the transmission channel, here the analog MAC channel, in the frequency band to which said picture sequence is now adapted. Concurrently to the temporal sub-sampling, after filtering, the actual motion estimation is effected which has for its object to effect the determination of the motion information components which, once transmitted, will allow the recovery of the eliminated pictures. These picture information components which are required and sufficient to allow said recovery are transmitted over the digital-assistance channel (the DATV channel, which stands for digitally-assisted TV) which is associated with the analog MAC channel.

Figure 1A:
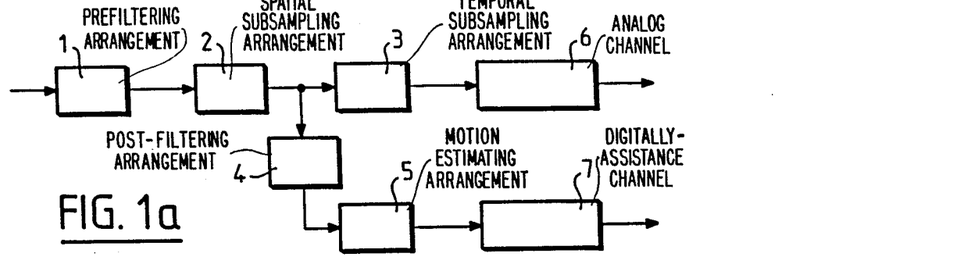
FIGS. 1a and 1b show the essential arrangements included in the transmission system according to the invention.
Figures 1B, 5:
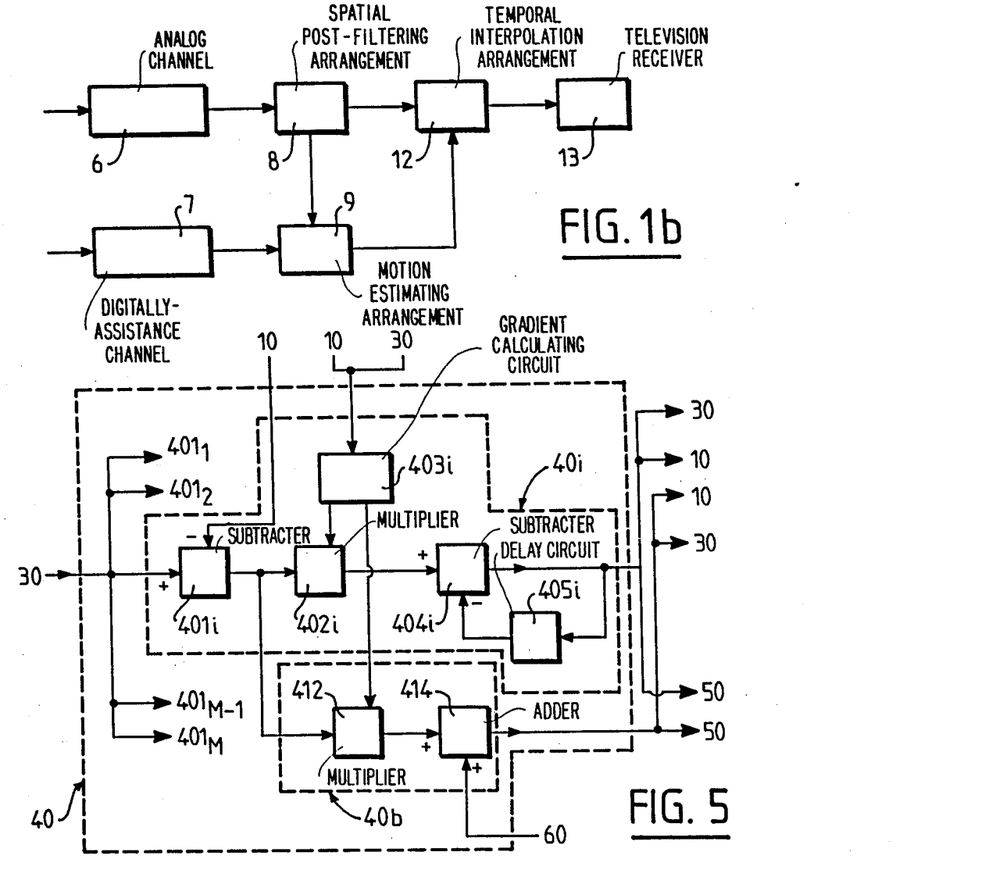
FIGS. 5 and 6 show an embodiment of the recursive displacement estimator and the delayed decision circuit of the arrangement of FIG. 4.

At the receiving side a temporal interpolation preceded by a post-filtering (i.e. a spatial interpolation based on these signals) of the signals transmitted by the analog channel and a new motion estimation on the basis of the signals resulting from said post-filtering operation and also the information components transmitted via the digital-assistance channel provides again a high-definition picture. FIGS. 1a and 1b illustrate all these above-mentioned functions, showing, at the transmission side, a prefiltering arrangement 1, a spatial sub-sampling arrangement 2, a temporal sub-sampling arrangement 3, a post-filtering arrangement 4 and a motion estimating arrangement 5, and also an analog channel 6 and a digital-assistance channel 7, respectively, and, at the receiving side, arranged at the outputs of these channels 6 and 7, a spatial post-filtering arrangement 8, a motion estimating arrangement 9 and a temporal interpolation arrangement 12, and also a television receiver 13.

The method of estimating and compensating motion according to the invention will now be described in greater detail, after the object of these operations has been defined, that is the object of determining for each block of an eliminated picture (for example the picture corresponding to the instant t+(2k+1)T, or $(2k+1)^{th}$ picture) a displacement vector D such that it is possible to obtain an approximation of the eliminated picture on the basis of half the sum of the non-eliminated pictures surrounding it (in the present example half the sum of the pictures 2k and 2k+2). In this present example, this approximation is expressed by the relation (1) which is shown in the annex to this description, wherein X indicates the current considered block in the picture 2k+1 or its representative element, D being the motion vector when the motion estimation has been applied to the images (2k, 2k+2), and B indicates the approximation of the current block of the picture (2k+1).

In accordance with the invention, when the scanning of the picture blocks progresses, these blocks will be classified, with a displacement through L blocks as described further on, in one of the following three groups: a first group of blocks denoted blocks estimated by corrected horizontal recursion, a second group of blocks denoted blocks estimated by horizontal recursion without correction, and a third group of blocks denoted blocks estimated by vertical recursion. This classification is based on the following considerations: let it be assumed that each current block X of the image 2k+1 to be eliminated on transmission and to be recovered on reception is submitted to a displacement which is either identical to or near the displacement to which one of the preceding blocks (taken in the scanning direction of said picture) is submitted. If $D_{i+1}$ is the displacement vector of the current block X, three solutions are then possible:

(a) When the displacement vector of the block which precedes the current block X in the scanning direction is denoted by $D_i$, and by adding the index h to this vector $D_i$ to express that a horizontal displacement is concerned, the relation (2) can be written, that is to say $D_{i+1}$ is equal to the displacement vector $D_{ih}$ of the preceding block taken in the analysing direction of blocks, modified by a displacement correction term $dD_{ih}$: the motion of the block is estimated by horizontal recursion, and the current block belongs to the first group of blocks when a decision as regards this classification was taken at that instant. In the foregoing it was described that such a decision can only be taken after a delay.

(b) The second solution corresponds to the solution expressed by the relation (3) wherein $D_{i+1}$ is equal to $D_{ih}$, without any displacement correction term, and the current block will then belong to the second group of blocks if there the decision is taken immediately without any delay.

(c) The third possibility is for the displacement of the current block to be equal to the displacement vector of the vertically adjacent block of this current block modified by a displacement correction term $dD_{iv}$, which is expressed by the relation (4) wherein the index v denotes the vector $D_i$ to express the vertical position of said spatially adjacent block just considered.

In the foregoing it has been mentioned that actually each decision is only taken after a delay. Classifying each block in one of the three groups is not effected immediately, but only after a predetermined number of possible sequences of groups for L blocks subsequent to the block under consideration have been examined. Consequently, the direction and the amplitude of the displacement vector will be corrected in a following block as a function of the group of the block and the classifying error made for this block, or for its central element X which is representative of the block. This classifying error is equal to the brightness difference between the representative element of the current block (picture 2k+2) and its corresponding element in the preceding picture 2k, taking into account the effective displacement of this block relative to said preceding picture.

In order to define a classifying criterion, measured are then taken to minimize the classifying error by examining (within a certain limit with the object of limiting the complexity of the corresponding operating circuits) the influence of a displacement estimated for a block on the displacement estimated for the L subsequent blocks. This influence can be studied by constructing a classifying tree, shown in FIG. 2, whose successive branches at the levels 1, 2, . . . , L correspond to three possible groups to which the consecutive L blocks in the scanning direction are assumed to belong. If there are L branching levels, such a tree consequently has $3^L$ branches, of which optionally only a number M of so-called surviving branches are actually retained. For example, at the arrival of the second block, three branches are construed in this tree, thereafter this procedure is repeated for each branch thus appearing. The number of branches is then multiplied by three at each level, at least when this number of appearing branches remains less than a limit M. Such a limit of the number of authorized branches, which is significantly less than the maximum number of branches possible for a determined branching level, may actually be and generally is fixed, so as to limit the complexity of the arrangement for putting the method into effect. As soon as this number M is exceeded, even for a level of the order less than L, then, in the tree structure, not more than M branches, the surviving branches, are systematically retained, the other branches being eliminated.

Figure 2:
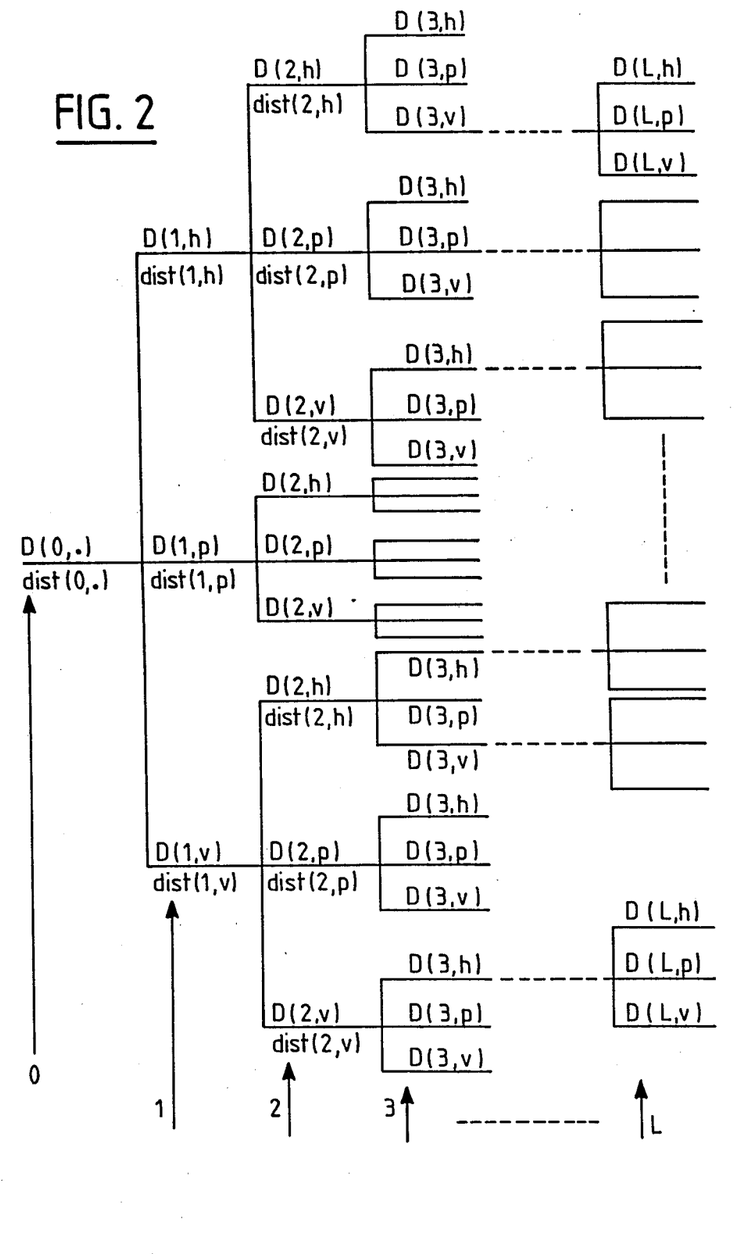
FIG. 2 shows an example of a picture block classification tree, in which a distinction is made for each block between its possible appearance in a first group of blocks estimated in accordance with a corrected horizontal recursion mode, in a second group of blocks estimated by horizontal recursion without correction, or in a third group of blocks which are estimated by vertical recursion.

In the classifying tree shown in FIG. 2, two parameters are associated to each branching level and to each of the three branches relating to three groups. The first parameter is the displacement vector already defined in the foregoing and laid down in FIG. 2 in accordance with its branching level 1 to L and in accordance with the possible group (h, p, v for the first, the second and the third groups, respectively): for example D(2,h), D(3,p), etc . . . The second parameter characteristic of each branch is the accumulated distortion, which is also noted in accordance with the level and the possible group: for example dist(1,p), dist(3,v), etc. . . . Accumulated distortion must here be understood to mean the accumulated sum of the approximation error of the current block and those of the preceding blocks in the group of blocks L. The approximation error for an element is proportional to the brightness difference between this point and its homologue in the preceding picture, and is here written for each element of the block X, DFD(X, D), in accordance with the expression (5), wherein D denotes the motion vector associated with each branch. For the current block, this approximation error is equal to the sum of the squares of the errors DFD of all the elements of the block. In the tree of FIG. 2, the indications of the motion vector and the accumulated distortion have not all been reproduced, so as not to make this Figure too complex when the branches become more numerous.

In the foregoing it has been described that $D_{i+1}$, the displacement vector of the current block X (X=the representative element of this block), was defined by one of the relations (2), (3) or (4) depending on the group to which this block would belong if the classification decision were immediate. For the blocks of the second group, $D_{i+1}$ is equal to $D_{ih}$ and the determination is therefore immediate. For the blocks of the first and the third gorups, $dD_{ih}$ and $dD_{iv}$, respectively, must be evaluated. This displacement correction terms dD are proportional to the product of the gradient (or spatial variation) of the brightness of the element homologous to the representative point, taking account of the displacement in the preceding picture, and the approximation error (defined hereinbefore) of the brightness intensity of the central element representative of the block, which is, for example, expressed by the relation (6).

Figure 3:
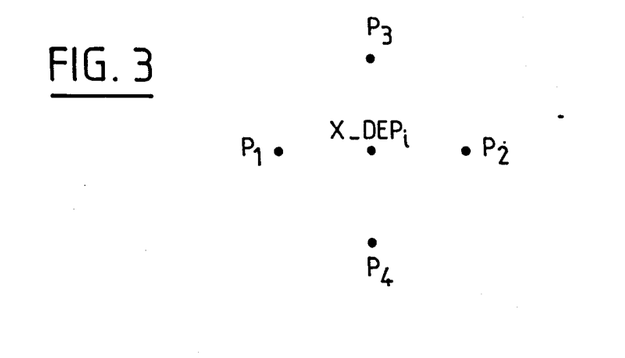
FIG. 3 shows four picture elements $P_1$, $P_2$, $P_3$, $P_4$ on the brightness of which operations are performed to determine the brightness of the picture element X-$DEP_i$.

In this relation, the spatial brightness gradient in an element, expressed in vectorial form (gradient in the horizontal direction, gradient in the vertical direction), acts on the brightness of the adjacent elements $P_1$, $P_2$, $P_3$, $P_4$ of the homologous element, denoted $X-DEP_i$, of the preceding picture. FIG. 3 shows these four elements $P_1$, $P_2$, $P_3$, $P_4$ surrounding the element $X-DEP_i$, and the spatial gradient is defined by the relation (7). In the special case of the invention, this gradient, as worked out in the relation (8), is half the sum of the gradients calculated for the consecutive pictures 2k and 2k+2 in the region of the element $X-D/2$ for the picture 2k and of the element $X+D/2$ for the picture 2k+2: in this relation (8), GRAD(X−D/2, 2k) relates to the elements $P_1$ to $P_4$ surrounding the element $X-D/2$ in the image 2k and GRAND(X+D/2, 2k+2) relates to the point $P_1$ to $P_4$ surrounding the element $X+D/2$ in the picture 2k+2.

The method of constructing the tree is continued upon the $L^{th}$ blcok while linking new parameters D(.,.) and dist(.,.) to each new branch. A majority decision is then taken as regards the effective group and the effective displacement vector of the block preceding the currently considered block of the L blocks.

This delayed decision is preceded, as described above, by the elimination of $3^L-M$ branches, by progressive elimination (at each level comprised between 1 and L) of all those branches which are in excess of the number M, the surviving branches being the branches having the weakest accumulated distortion. Among the M surviving branches at the end of constructing the classifying tree (or among the $3^L$ branches when the number of levels is sufficiently low so that the number $3^L$ is not too high and the elimination of the branches is not realized), the accumulated distortion attached to each of them is again investigated. In the foregoing it has been stated that the objective of the motion estimation is to determine for each block of the image 2k+1 a motion vector D by means of which it is possible to obtain an approximation of the image 2k+1 on the basis of half the sum of the images 2k and 2k+2. This objective can be formulated differently, when it is considered that one wants to assign to each picture block a parameter D such that the expression (9) is minimal. In all these cases, the delayed decision is taken in the following manner: being now informed on the L additional picture blocks, the corresponding survinving branches are investigated and the first block (preceding the current block of L blocks) is classified in the group of blocks to which the highest number of the surviving branches correspond. The corresponding displacement vector is then considered as being the displacement vector of this first block, and so forth. Starting from the $L^{th}$ block, in the scanning direction, the procedure renders it possible to determine, at the arrival of each new block, a group (and a displacement vector) which corresponds to the preceding block of this new block of L blocks. For the L last blcoks of the picture, no such majority decision is taken, and the classification sequence minimizing the accumulated distortion is retained.

Figure 4:
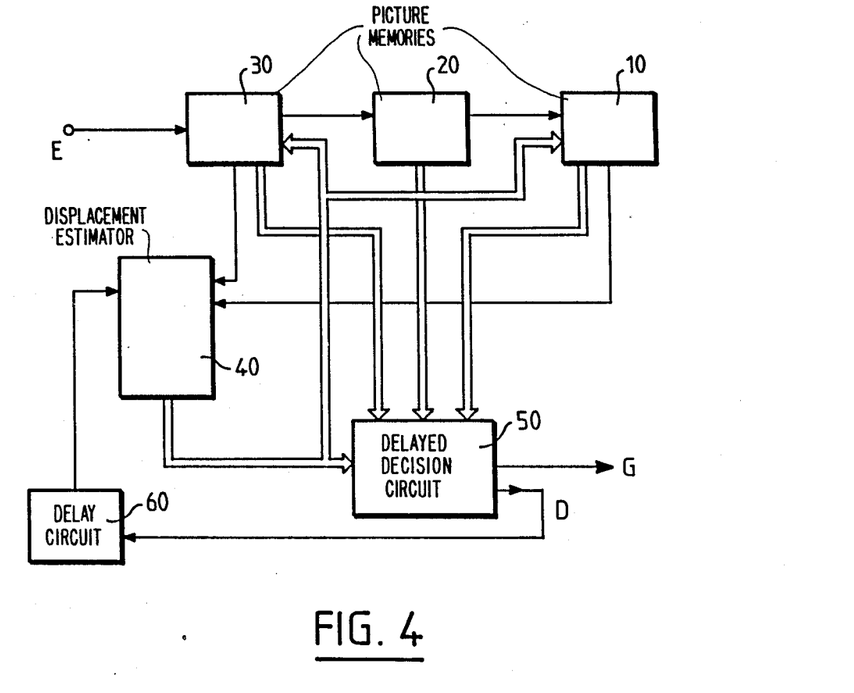
FIG. 4 shows an embodiment of a motion estimating and compensating arrangement according to the invention.

FIG. 4 shows an embodiment of a motion estimating and compensating arrangement by means of which the method described in the foregoing can be put into effect. The leading picture, present on an input line E on which the digital samples occur (for example at a sampling rate equal to 54 MHz for the case described here of a video picture), is applied to three picture memories 10, 20, 30, arranged in series to ensure the permanent storage of three cnsecutive pictures, for example of the rank 2k, 2k+1, 2k+2, of the picture sequence. The output of the memory 10 storing the image 2k and the output of the memory 30 storing the picture 2k+2 are converged to a recursive displacement estimator 40 which effects the calculations of the gradiants and the correction terms $dD_{ih}$ and $dD_{iv}$.

This estimator 40 is comprised of M identical stages 40-A to 40-M. Each individual stage of these M stages comprises a cell 40a for calculating the new displacement in accordance with the corrected horizontal recursion mode and a cell 40b for calculating the new displacement in accordance with the vertical recursion mode. Actually, the cell 40b is identical for each of the M stages and is therefore preferably common to all those stages. Therefore only one cell 40i (i varying from 1 to M) will be described with reference to FIG. 5 which shows the estimator 40, thhe index i for all the circuit elements concerned, and the cell 40b common to M stages, without any index for the elements concerned.

In this FIG. 5, the illustrated cell 40i comprises a subtracter 401i which, at its, for example positive, input receives the output from the picture store 10 and, at its negative input the output from the picture store 30. This subtracter supplies as its output signal the brightness difference between the element X which is representative of the current block of the picture 2k+2 and the homologous element $X-DEP_i$ of the preceding picture 2k. This output signal of the subtracter 401i is applied to two multipliers 402i and 412 which take the product thereof by the spatial gradient of the brightness at the element $X-DEP_i$ (the multiplier 402i being associated with the $i^{th}$ cell 40i and the multiplier 412 with the cell 40b which is common to the M stages). This gradient is itself supplied in the vectorial form (gradient in the direction m, gradient in the direction n) by a gradient calculating circuit 403i which acts on the brightness of the adjacent elements $P_1$, $P_2$, $P_3$, $P_4$.

The vectorial output signal of the multipliers 402i and 412 is then processed as follows. The output signal of the multiplier 402i is received by a recursive filter without weighting which allows the horizontal displacement $D_h$ to be shown. This filter comprises a subtracter 404$i$ and a delay circuit 405$i$ which is a delay memory of the vector $D_h$. The circuit 405$i$ receives the output from the subtracter 404$i$ and applies it again, with a delay, to the negative input of this subtracter, whose output supplies the new displacement vector in accordance with the corrected horizontal recursion mode. The output signal of the multiplier 412 itself is received by an adder 414 which also receives the output of a circuit 60 producing a delay of one line, whose object will be described hereinafter, and which supplies the new displacement vector in accordance with the vertical recursion mode.

Figure 6:
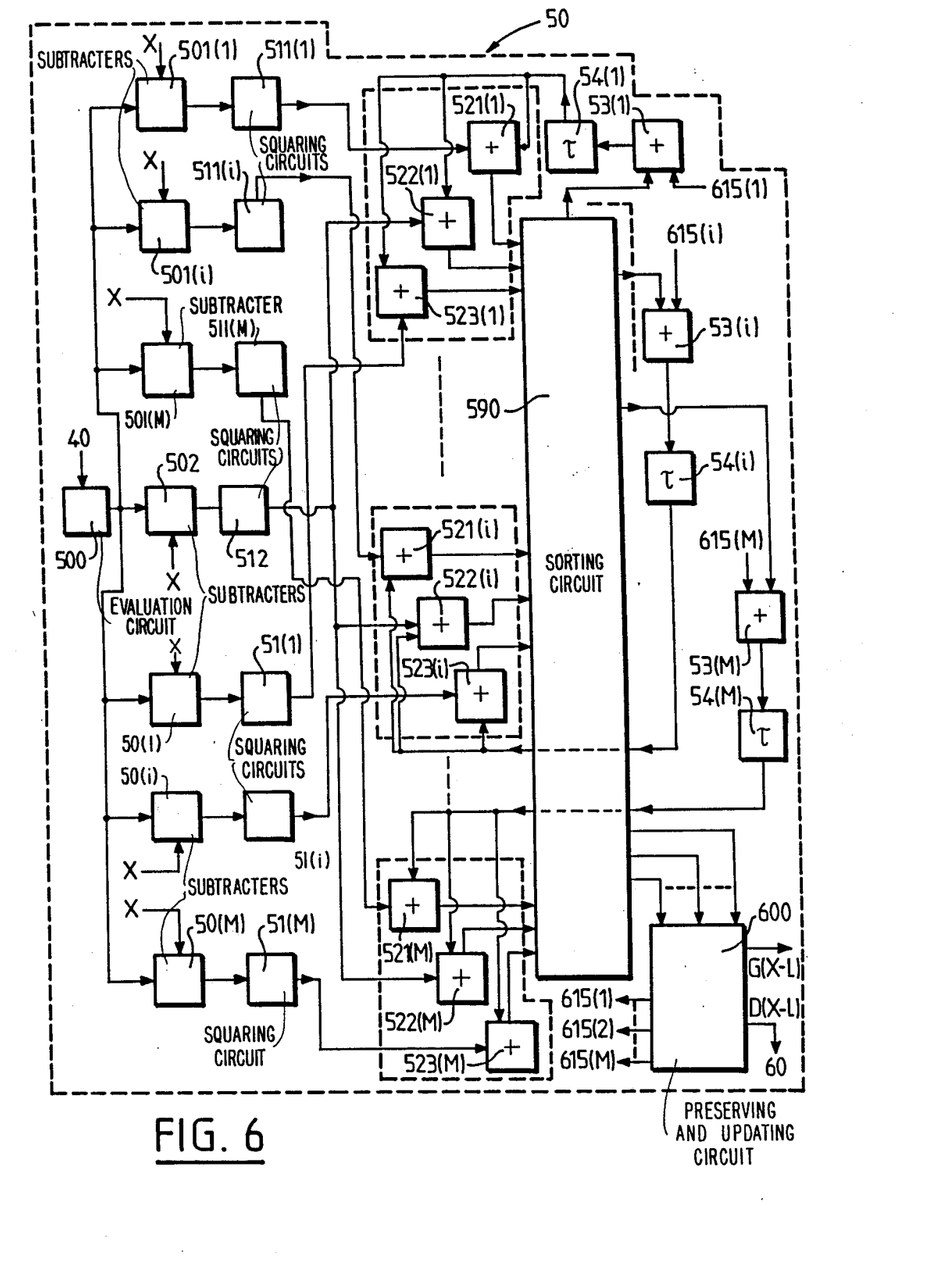

The motion estimating and compensating arrangement finally includes a delayed decision circuit 50, a preferred embodiment of which is shown in FIg. 6. This decision circuit first of all includes an evaluation circuit 500 which takes half the sum of the brightness of the corresponding blocks $X-DEP_i$ and $X+DEP_i$ of the respective pictures 2k and 2k+2. The output of this circuit 500 is arranged in parallel on the one hand, for the branches corresponding to the corrected horizontal recursion mode, with M respective inputs of the M substracters 501(1) to 501(M), on the other hand with the input of a further subtracter 502 (vertical recursion mode), and finally, for the branches corresponding to the horizontal recursion mode without correction, with the M respective inputs of the M further subtracters 50(1) to 50(M). The numbers between brackets (1 to M) denote of course the junctions of the classifying tree.

The values thus obtained according to groups are squared in (2M+1) circuits 511(1) to 511(M), 521, and 51(1) to 51(M) and averaged for all the elements of the block, and the outputs of these circuits are applied to 3M adders for obtaining the sum of the classifying errors for all the picture elements forming the current block. The further elements of the delayed decision circuit 50 are strictly identical to those described with reference to FIG. 5 of the Patent Application FR-A 2,590,701; U.S. Pat. No. 4,766,490 mentioned in the foregoing and consequently are given the same reference numerals. It should however be noted that the circuit 600 for preserving and updating the classifying tree produces, for each block $(X-L)$ preceding the current block of the L blocks, a group information $G(X-L)$ (i.e. the indication of the group in which this block $(X-L)$ is definitely classified) and a corresponding displacement vector information $D(X-L)$, but that, for the case described with reference to FIG. 4, only the group information is transmitted via the digital assistance channel. The vectors $D(X-L)$ are stored in the circuit 60 (delay circuit producing a delay of one line) which transfers it to the estimator 40 after having produced a delay of one line.

On reception there are then available on the one hand, at the output of the analog channel 6, the spatial and temporal subsampling signals in the arrangements 2 and 3, respectively, and on the other hand, at the output of the digital assistance channel 7, the classifying group of the blocks. The output signals of the analog channel 6 are received by the post-filtering arrangement 8, whose output signals are received by the motion estimating arrangement 9 and also by the temporal interpolation arrangement 12.

Figure 7:
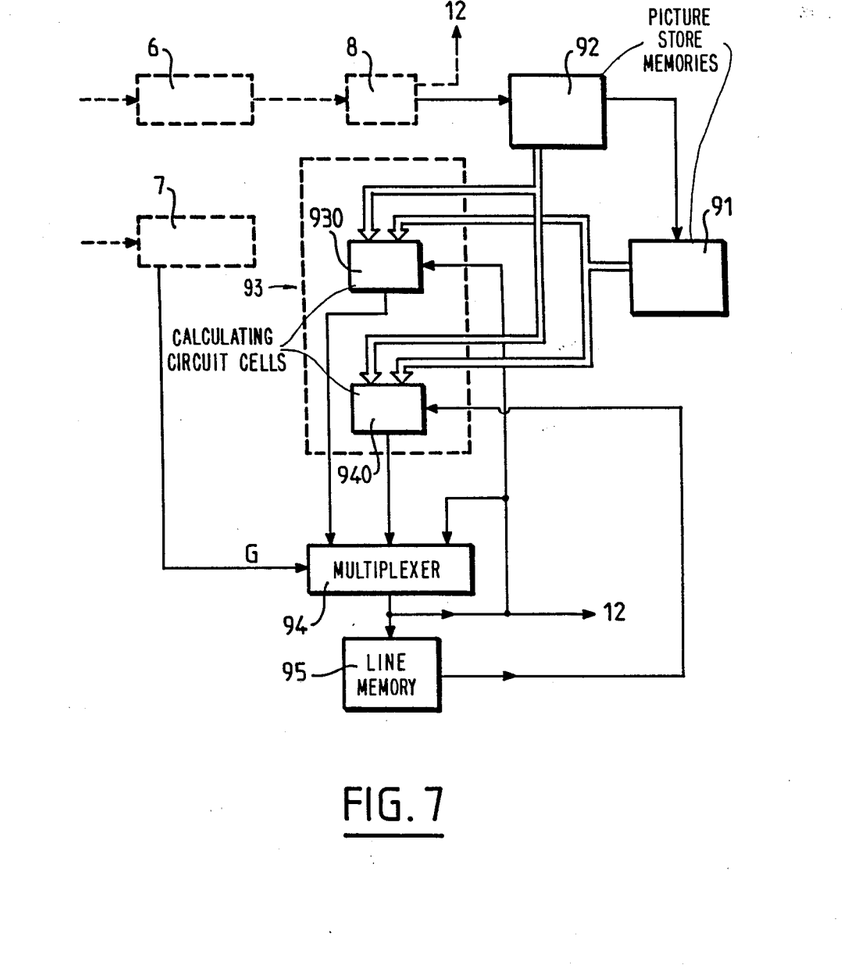
FIG. 7 shows an embodiment of the motion estimating arrangement provided at the receiving end in the transmission system according to the invention.

FIG. 7 shows an embodiment of the motion estimating arrangement 9 at the receiving side. This arrangement 9 first of all includes two picture stores 91 and 92 which are arranged in series at the output of the post-filtering arrangement 8 and which store two consecutive pictures transmitted via the analog channel. The output of each of the memories 91 and 92 is applied to a displacement calculating circuit 93 which receives these two output signals of the memories but also the displacement vectors $D_1$ of the block precding it in the scanning direction and $D_2$ of the spatially adjacent block situated on the preceding line, and which has for its object to supply the three vector values corresponding to the three recursion modes (corrected horizontal recursion, horizontal recursion without correction, vertical recursion).

To this end, the displacement calculating circuit 93 includes two cells 930 and 940 of the same type as those provided in the estimator 40 at the transmission end, in that sense that the cell 930, for example, (or 940) includes a subtracter which at one input receives the output of one of the stores 91 and 92 and at the other input the output of the other store 92 or 91, and whose output is applied to a vectorial multiplier. This vectorial multiplier moreover receives the vectorial output signal of a gradient calculating circuit, the latter also receiving the output of the picture stores 91 and 92. The vectorial output sigal of the vectorial multiplier is then processed not by two recursive filters without weighting in the estimator 40, but by two adders whose second input is defined hereinafter.

The three displacement vector values corresponding to the three possible recursion modes are then transferred to a multiplexer 94 which, as a function of the group $G(X-L)$ transmitted via the digital-assistance channel 7, selects for each block that one of the displacement vectors that corresponds to this group and transfers it to the temporal interpolation arrangement 12 which takes half the sum of two adjacent pictures, taking the displacements into account. This displacement vector is moreover applied to a line memory 95 which returns it, delayed by one line, to the second input of said adder of the displacement calculating cell 940 of the circuit 93, and also returns it directly to the second input of said adder of the cell 930 of this circuit 93. Then the cell 930 supplies this displacement vector value either directly, in the case of the horizontal recursion mode without correction (the displacement vector is the same as that in the preceding block), or this displacement vector value is incremented by $dD_{ih}$, for the case of the corrected horizontal recursion mode. For the case of the vertical recursion mode the cell 940 supplies the value returned by the line memory 95, increased by $dD_{iv}$.

It must be understood that the present invention is not limited to the above-described embodiment, variations and extensions of which are possible without departing from the framework of the invention.

It should particularly be noted that the invention does not only relate to the motion estimating and compensating arrangement on transmission, as described above, or motion estimating and compensating arrangements corresponding thereto provided at the receiving end, but also to a system for transmitting high-definition television pictures, including such arrangements. More accurately, the invention relates to such a system when it is intended for the transmission of picture sequences via an analog channel having a limited passband which implies a process of compressing the quantity of information components to be transmittted, with a view to adapt these information components to the bandwidth of the channel. Such an adaptation may basically be realized by a spatial suppression or a temporal suppression of the information components, which is realized, in the embodiment described, with the aid of spatial sub-sampling device 2 and temporal sub-sampling arrangement 3.

The invention also encompasses any transmission stage which, in such a transmission system, comprises the structure described and more specifically includes a motion estimating and compensating arrangement in accordance with the preferred embodiment proposed in the foregoing, as well as to any corresponding receiving stage. As has been described, such a receiving stage is provided between the post-filtering arrangement 8 and the time interpolation arrangement 12 with the motion estimating arrangement 9 as described hereinbefore.

In a transmission system described so far, the output of the motion estimating and compensating arrangement supplies an information of the group to be transferred to the receiving stage via the digital-assistance channel. Obviously, this receiving stage then includes the motion estimating arrangement 9. However, if one wants to simplify the receiving stage, the arrangement 9 may be omitted. Acting thus, the sensitivity to transmission noise is reduced at the receiving end. The information transferred by the digital-assistance channel is then no longer the block classifying group, but the displacement vector which is ultimately retained for each of these blocks, and this displacement vector information is applied directly to the temporal interpolation arrangement 12, the line connecting the arrangements 8 and 9 then no longer being needed. The invention then relates to both the transmission stage thus modified, and to the simplfied receiving state resulting therefrom, and to the transmission system including such transmission and receiving stages.

In this variant of the embodiment, the quantity of data to be transmittted by the digital-assistance channel may become higher than the maximum flow rate of this channel. It is then advantageous to encode these motion vectors to be transmitted, with the object of reducing the flow rate. Numerous encoding circuits for this purpose exist and will therefore not be described in greater detail here. The sole criterion to be applied for the choice of this circuit is to achieve the compatibility between the required flow rate and the transmission of the motion vectors and the capacity of the digital-assistance channel.

ANNEX $$B(X, 2k + 1) = \frac{B(X - D/2, 2k) + B(X + D/2, 2k + 2)}{2} \quad (1)$$

$$D_{i+1} = D_{ih} + dD_{ih} \quad (2)$$

$$D_{i+1} = D_{ih} \quad (3)$$

$$D_{i+1} = D_{iv} + dD_{iv} \quad (4)$$

$$DFD(X,D) = B(X, 2k + 1) - B(X, 2k + 1) \quad (5)$$

$$dD_{ih} = \text{Grad}(X, D_{ih}) * DFD(X, D_{ih}) \quad (6)$$

$$\text{Grad}(X - DEP_i) = \frac{1}{2} \begin{bmatrix} A - B \\ C - D \end{bmatrix} \quad (7)$$

$$\text{Grad}(X,D) = \quad (8)$$

-continued
ANNEX $$[\text{Grad}(X - D/2, 2k) + \text{Grad}(X + D/2, 2k + 2)]/2$$

$$\sum_{\text{blocs}} [B(X, 2k + 1) - B(X, 2k + 1)]^2 \quad (9)$$

I claim:

1. A method of estimating and compensating motion in a sequence of pictures in which the brightness of each picture element is expressed digitally, characterized in that each picture is divided into blocks of $I \times J$ elements, each of these blocks being defined by two coordinates (m, n) which denote the rank m of the picture line in which a block is located and the position n of the block in this $m^{th}$ line, respectively, and in that said method comprises:

(A) preserving three consecutive pictures in the sequence of initial pictures, denoted by the respective ranks 2k, 2k+1, 2k+2;

(B) defining for the blocks three groups in which they are classified, a first group wherein said blocks are estimated by corrected horizontal recursion, a second group wherein said blocks are estimated by non-corrected horizontal recursion and a third group wherein said blocks are estimated by vertical recursion, in which groups the blocks will be classified, with a delay of L blocks, in accordance with the progressing picture scan, by examining, to effect said classification, a predetermined number of sequences of possible groups for the L blocks subsequent to the considered current blocks X, the criterion on which this classification is based being the difference in brightness between two pictures in the sequence of pictures, taking the displacement which occurs between one picture and another into account;

(C) forming a classifying tree whose three branches seen at each branching point are equal in number to those of the possible groups and whose $3^L$ branches occurring as a result thereof at each successive level 1 to L correspond to the sequences of possible groups for the L consecutive considered blocks;

(D) assigning two parameters to each branch of each level:

(a) a first parameter, the displacement vector, which is representative of any displacement of the current block of the picture 2k+1 relative to the preceding and subsequent pictures 2k and 2k+2 and is calculated for the element which is representative of said block with the aid of a recursive displacement estimation method;

(b) a second parameter, the accumulated distortion parameter, which is representative of the accumulated sum of the approximation error of the current block and those of the preceding blocks in the number L of blocks, each approximation error being rendered minimal by taking into account the influence of an estimated displacement for a block on the displacement estimated for the L subsequent blocks, and said influence possible not being investigated, among the $3^L$ possible branches of the classifying tree, with the exception of M branches of the weakest accumulated distortion, referred to as surviving branches, M being a limited number less than the maximum number of branches $3^L$;

(E) taking, at the end of this method, as regards L consecutive blocks in the scanning direction, a majority decision as regards the effective group of the block which, relative to the current block, is located L blocks earlier, said decision being taken by examining the surviving branches and by classifying said blocks situated L blocks earlier in the group to which the majority of surviving branches correspond, and said decision procedure being repeated in an identical manner with the exception of the L last blocks for which no majority decision is taken.

2. A method of estimating and compensating motion as claimed in claim 1, characterized in that, the number L being chosen equal to 0, it comprises:
 (A) preserving three consecutive pictures in the initial sequence of pictures, denoted by the respective ranks $2k$, $2k+1$, $2k+2$;
 (B) assigning two parameters to each block:
  (a) a first parameter, the displacement vector, which is representative of the possible displacement of the current block of the image $2k+1$ relative to the preceding and subsequent pictures $2k$ and $2k+2$ and calculated for the representative element of said block;
  (b) a second parameter, the local distortion parameter, which is representative of the approximation error of the current block;
 (C) defining for the blocks three groups in which they are classified, a first group wherein said blocks are estimated by corrected horizontal recursion, a second group wherein said blocks are estimated by a non-corrected horizontal recursion, and a third group wherein said blocks are estimated by vertical recursion, in which groups the blocks will be classified during the progressing picture scan, by examining, to effect said classification, said approximation error which must be rendered minimal;
 (D) taking, in accordance with this method, after said examination of the local distortion, a decision as regards the effective group of the current block.

3. An arrangement for estimating and compensating motion in a sequence of pictures, provided for putting the method as claimed in claim 2 into effect and characterized in that it includes first, second and third picture stores arranged in series to ensure the permanent storage of the three respective consecutive pictures denoted, for example, by their rank $2k$, $2k+1$, $2k+2$ in the sequence of pictures, and a recursive displacement estimator which receives the output signals of said first and third picture stores to update at each extension of the classifying tree the displacement vectors relative to the junctions of the tree and to apply them to a delayed-decision circuit, said delayed-decision circuit receiving said updating information and also the outputs of said picture stores and supplying, for each block preceding the current block of L blocks, the information of the group in which this preceding block is finally classified and the information on the corresponding displacement vector.

4. An arrangement as claimed in claim 3, characterized in that the recursive displacement estimator comprises M identical stages which themselves each comprise a cell for calculating the new displacement in accordance with the corrected horizontal recursion mode and a cell to calculate the new displacement in accordance with the vertical recursion mode.

5. An arrangement as claimed in claim 4, characterized in that the delayed-decision circuit comprises:
 (A) a circuit for evaluating half the sum of the brightnesses of the corresponding blocks $X-DEP_i$ and $X+DEP_i$ of the respective pictures $2k$ and $2k+2$;
 (B) arranged in parallel with the output of this circuit, $(2M+1)$ subtracters corresponding to the respective M branches associated with the corrected horizontal recursion mode, with the branch corresponding to the vertical recursion mode, and corresponding to the M branches which correspond to the horizontal recursion mode without correction, followed by the series arrangement of $(2M+1)$ squaring circuits;
 (C) 3M adders whose output signals represent the accumulated distortions of the branches of the classifying tree;
 (D) a selection circuit for said 3M output signals;
 (E) a circuit for preserving and updating the classifying tree.

6. An arrangement for estimating and compensating motion in a sequence of pictures, provided for putting the method as claimed in claim 1 into effect and characterized in that it includes first, second and third picture stores arranged in series to ensure the permanent storage of the three respective consecutive pictures denoted, for example, by their rank $2k$, $2k+1$, $2k+2$ in the sequence of pictures, and a recursive displacement estimator which receives the output signals of said first and third picture stores to update at each extension of the classifying tree the displacement vectors relative to the junctions of the tree and to apply them to a delayed-decision circuit, said delayed-decision circuit receiving said updating information and also the outputs of said picture stores and supplying, for each block preceding the current block of L blocks, the information of the group in which this preceding block is finally classified and the information on the corresponding displacement vector.

7. An arrangement as claimed in claim 6, characterized in that the recursive displacement estimator comprises M identical stages which themselves each comprise a cell for calculating the new displacement in accordance with the corrected horizontal recursion mode and a cell to calculate the new displacement in accordance with the vertical recursion mode.

8. An arrangement as claimed in claim 7, characterized in that the delayed-decision circuit comprises:
 (A) a circuit for evaluating half the sum of the brightnesses of the corresponding blocks $X-DEP_i$ and $X+DEP_i$ of the respective pictures $2k$ and $2k+2$;
 (B) arranged in parallel with the output of this circuit, $(2M+1)$ subtracters corresponding to the respective M branches associated with the corrected horizontal recursion mode, with the branch corresponding to the vertical recursion mode, and corresponding to the M branches which correspoond to the horizontal recursion mode without correction, followed by the series arrangement of $(2M+1)$ squaring circuits;
 (C) 3M adders whose output signals represent the accumulated distortions of the branches of the classifying tree;
 (D) a selection circuit for said 3M output signals;
 (E) a circuit for preseving and updating the classifying tree.

9. A picture transmission system using a channel having a limited passband which implies a compression procedure for the quantity of information components to be transmitted with a view of their adaptation to said band, said system comprising at least one transmission stage and a receiving stage, characterized in that the transmission stage includes an arrangement for estimating and compensating motion as claimed in claim 8.

10. A system as claimed in claim 9, in which said transmission and receiving stages comprise at least one spatial sub-sampling arrangement and a temporal sub-sampling arrangement, respectively, and at least a spatial post-filtering arrangement and a temporal-interpolation arrangement, said system being characterized in that the output of the motion estimating and compensating arrangement, supplying the information on the group in which the block preceding the current block of the L blocks is finally classified, is coupled to a digital-assistance channel which ensures the transmission of said group information.

11. A transmission system as claimed in claim 10, characterized in that the receiving stage includes, arranged in parallel with the link between the spatial post-filtering arrangement and the temporal-interpolation arrangement, a motion estimating arrangement which is also connected to the output of said digital-assistance channel, said motion estimating arrangement comprising first and second picture stores which are arranged in series at the output of the spatial post-filtering arrangement, a displacement calculating circuit receiving the outputs of each of the two picture stores and intended to supply the three displacement vectors corresponding to, respectively, the first, second and third recursion modes denoted the corrected horizontal recursion, the non-corrected horizontal recursion and the vertical recursion, respectively, and a multiplexer or switching circuit intended to select for each block that one of the displacement vectors that corresponds to the output information of the digital-assistance channel and to transfer said vector to the temporal interpolation arrangement.

12. A system as claimed in claim 9, in which said transmission and receiving stages comprise at least a spatial sub-sampling arrangement and a temporal sub-sampling arrangement, respectively, and at least a spatial post-filtering arrangement and a temporal interpolation arrangement, respectively, said system being characterized, in that the output of the motion estimating and compensation arrangement, supplying the information of said displacement vector which is ultimately obtained after decision, is coupled to a digital-assistance channel which ensures the transmission of said displacement vector information.

13. A transmission system as claimed in claim 12, characterized in that, in the receiving stage, the temporal interpolation arrangement receives directly the output information of the digital-assistance channel.

14. A transmission system as claimed in claim 12, characterized in that a coding circuit having for its object to compress the data rate constituting the information to be transmitted is included in the transmission stage, between the output of said motion estimating and compensating arrangement and the input of the digital-assistance channel.

15. A transmission system as claimed in claim 14, characterized in that, in the receiving stage, the temporal interpolation arrangement receives directly the output information of the digital-assistance channel.

16. A transmission stage for use in a system as claimed in claim 14, comprising at least a spatial sub-sampling arrangement, a temporal sub-sampling arrangement, a spatial post-filtering arrangement and a temporal-interpolation arrangement.

17. A receiving stage for use in a system as claimed in claim 14, comprising at least a spatial sub-sampling arrangement, a temporal sub-sampling arrangement, a spatial post-filtering arrangement and a temporal-interpolation arrangement.

18. A picture transmission system using a channel having a limited passband which implies a compression procedure for the quantity of information components to be transmitted with a view to their adaptation to said band, said system comprising at least one transmission stage and a receiving stage, characterized in that the transmission stage includes an arrangement for estimating and compensating motion as claimed in claim 6.

19. A system as claimed in claim 18, in which said transmission and receiving stages comprise at least one spatial sub-sampling arrangement and a temporal sub-sampling arrangement, respectively, and at least a spatial post-filtering arrangement and a temporal-interpolation arrangement, said system being characterized in that the output of the motion estimating and compensating arrangement, supplying the information on the group in which the block preceding the current block of the L blocks is finally classified, is coupled to a digital-assistance channel which ensures the transmission of said group information.

20. A transmission system as claimed in claim 19, characterized in that the receiving stage includes, arranged in parallel with the link between the spatial post-filtering arrangement and the temporal-interpolation arrangement, a motion estimating arrangement which is also connected to the output of said digital-assistance channel, said motion estimating arrangement comprising first and second picture stores which are arranged in series at the output of the spatial post-filtering arrangement, a displacement calculating circuit receiving the outputs of each of the two picture stores and intended to supply the three displacement vectors corresponding to, respectively, the first, second and third recursion modes denoted the corrected horizontal recursion, the non-corrected horizontal recursion and the vertical recursion, respectively, and a multiplexer or switching circuit intended to select for each block that one of the displacement vectors that corresponds to the output information of the digital-assistance channel and to transfer said vector to the temporal interpolation arrangement.

21. A system as claimed in claim 18, in which said transmission and receiving stages comprise at least a spatial sub-sampling arrangement and a temporal sub-sampling arrangement, respectively, and at least a spatial post-filtering arrangement and a temporal interpolation arrangement, respectively, said system being characterized, in that the output of the motion estimating and compensating arrangement, supplying the information of said displacement vector which is ultimately obtained after decision, is coupled to a digital-assistance channel which ensures the transmission of said displacement vector information.

22. A transmission system as claimed in claim 21, characterized in that, in the receiving stage, the temporal interpolation arrangement receives directly the output information of the digital-assistance channel.

23. A transmission system as claimed in claim 21, characterized in that a coding circuit having for its object to compress the data rate constituting the information to be transmitted is included in the transmission stage, between the output of said motion estimating and compensating arrangement and the input of the digital-assistance channel.

24. A transmission system as claimed in claim 23, characterized in that, in the receiving stage, the temporal interpolation arrangement receives directly the output information of the digital-assistance channel.

25. A transmission stage for use in a system as claimed in claim 18, comprising a spatial sub-sampling arrangement, a temporal sub-sampling arrangement, a spatial post-filtering arrangement and a temporal-interpolation arrangement.

26. A receiving stage for use in a system as claimed in claim 18, comprising at least a spatial sub-sampling arrangement, a temporal sub-sampling arrangement, a spatial post-filtering arrangement and a temporal-interpolation arrangement.

27. A picture transmission system using a channel having a limited passband which implies a compression procedure for the quantity of information components to be transmitted with a view of their adaptation to said band, said system comprising at least one transmission stage and a receiving stage, characterized in that the transmission stage includes an arrangement for estimating and compensating motion as claimed in claim 7.

28. A system as claimed in claim 27, in which said transmission and receiving stages comprise at least one spatial sub-sampling arrangement and a temporal sub-sampling arrangement, respectively, and at least a spatial post-filtering arrangement and a temporal-interpolation arrangement, said system being characterized in that the output of the motion estimating and compensating arrangement, supplying the information on the group in which the block preceding the current block of the L blocks is finally classified, is coupled to a digital-assistance channel which ensures the transmission of said group information.

29. A transmission system as claimed in claim 28, characterized in that the receiving stage includes, arranged in parallel with the link between the spatial post-filtering arrangement and the temporal-interpolation arrangement, a motion estimating arrangement which is also connected to the output of said digital-assistance channel, said motion estimating arrangement comprising first and second picture stores which are arranged in series at the output of the spatial post-filtering arrangement, a displacement calculating circuit receiving the outputs of each of the two picture stores and intended to supply the three displacement vectors corresponding to, respectively, the first, second and third recursion modes denoted the corrected horizontal recursion, the non-corrected horizontal recursion and the vertical recursion, respectively, and a multiplexer or switching circuit intended to select for each block that one of the displacement vectors that corresponds to the output information of the digital-assistance channel and to transfer said vector to the temporal interpolation arrangement.

30. A system as claimed in claim 27, in which said transmission and receiving stages comprise at least a spatial sub-sampling arrangement and a temporal sub-sampling arrangement, respectively, and at least a spatial post-filtering arrangement and a temporal interpolation arrangement, respectively, said system being characterized, in that the output of the motion estimating and compensation arrangement, supplying the information of said displacement vector which is ultimately obtained after decision, is coupled to a digital-assistance channel which ensures the transmission of said displacement vector information.

31. A tramsmission system as claimed in claim 30, characterized in that, in the receiving stage, the temporal interpolation arrangement receives directly the output information of the digital-assistance channel.

32. A transmission system as claimed in claim 30, characterized in that a coding circuit having for its object to compress the data rate constituting the information to be transmitted is included in the transmission stage, between the output of said motion estimating and compensating arrangement and the input of the digital-assistance channel.

33. A transmission system as claimed in claim 32, characterized in that, in the receiving stage, the temporal interpolation arrangement receives directly the output information of the digital-assistance channel.

* * * * *